(No Model.)
T. J. AGNEW.
UNDERGROUND CONDUIT FOR TELEGRAPH, TELEPHONE, AND OTHER WIRES.
No. 259,971. Patented June 20, 1882.
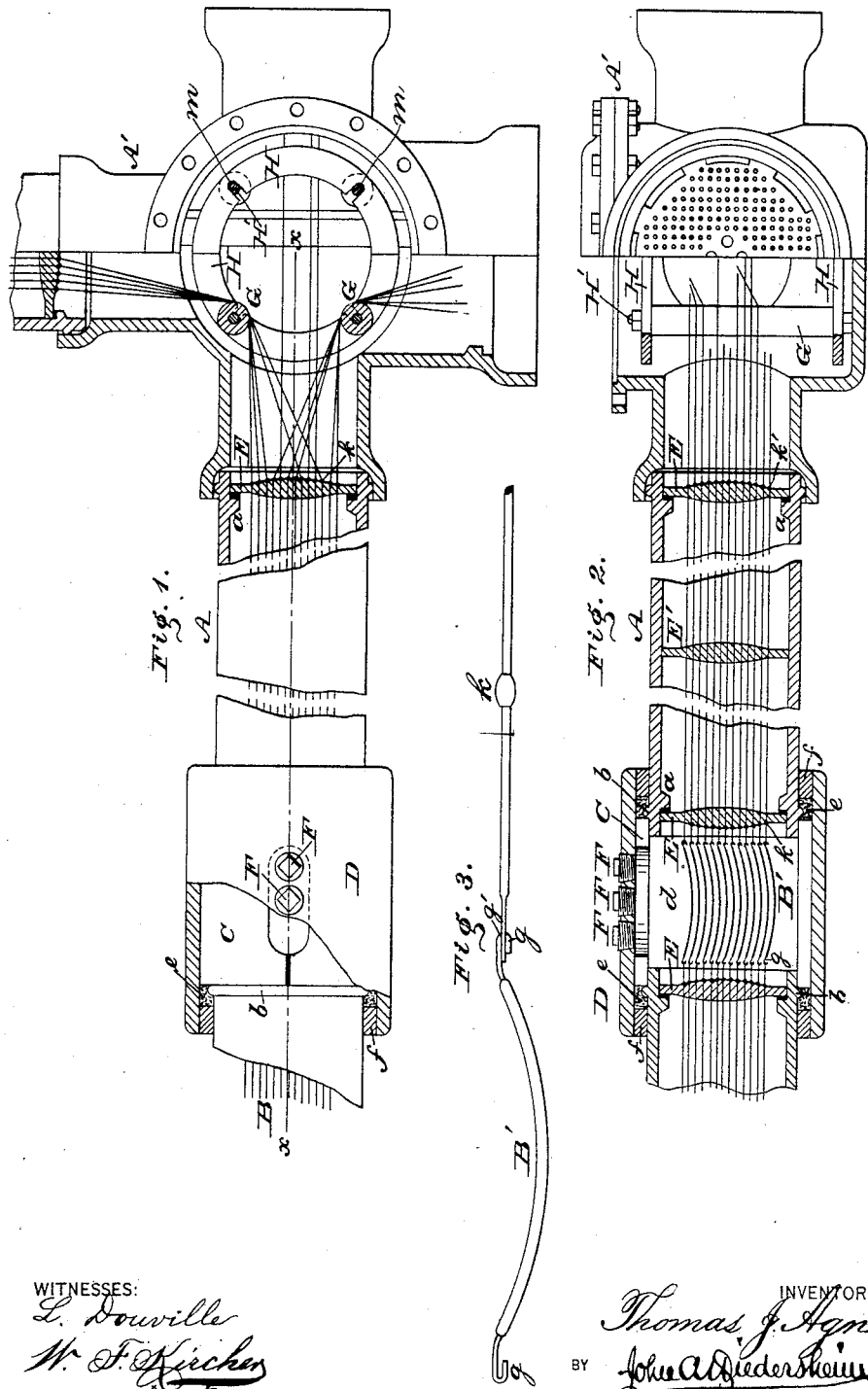
WITNESSES:
L. Douville
W. F. Kircher
INVENTOR:
Thomas J. Agnew,
BY John A. Niederstein
ATTORNEY.
N. PETERS, Photo-Lithographer, Washington, D. C.

UNITED STATES PATENT OFFICE.

THOMAS J. AGNEW, OF PHILADELPHIA, PENNSYLVANIA, ASSIGNOR OF THREE-FOURTHS TO BARRITT & CATTELL AND GEORGE W. SHEPPARD, JR., OF SAME PLACE, AND HARRISON A. THOMPSON, OF MAY'S LANDING, NEW JERSEY.

UNDERGROUND CONDUIT FOR TELEGRAPH, TELEPHONE, AND OTHER WIRES.

SPECIFICATION forming part of Letters Patent No. 259,971, dated June 20, 1882.

Application filed December 31, 1881. (No model.)

*To all whom it may concern:*

Be it known that I, THOMAS J. AGNEW, a citizen of the United States, residing in the city and county of Philadelphia, State of Pennsylvania, have invented a new and useful Improvement in Underground Conduits for Telegraph, Telephone, and other Wires, which improvement is fully set forth in the following specification and accompanying drawings, in which—

Figure 1 is a top or plan view, partly sectional, of the conduit embodying my invention. Fig. 2 is a section thereof in line $x\,x$, Fig. 1. Fig. 3 is a view of a detached part.

Similar letters of reference indicate corresponding parts in the several figures.

My invention consists of improvements in underground conduits for electric wires, whereby the wires are firmly and reliably sustained and held separated, and provision is made for the expansion and contraction of the conduits and wires.

It also consists of novel means of coupling or connecting the wires.

It further consists of supports for the wires at places where their directions are changed, whereby they are properly sustained and held taut without danger of breakage, and provision is made for the expansion and contraction of the wires at said places.

Referring to the drawings, A represents tubes or pipes of metal, terra-cotta, or other suitable material laid in the ground and receiving wires B for electric purposes.

On the inner face of each length of pipe is a bead, $a$, and on the outer face thereof is a bead, $b$, the beads being near the ends of the pipe.

C represents a divided sleeve which encircles the ends of adjacent pipes and abuts against the outer beads, $b$, thereof, or nearly so, it being noticed that the adjacent pipes are separated, forming a chamber, $d$, which is covered by said sleeve C.

Surrounding the sleeve C is a coupling-cap, D, which is longer than said sleeve, and extends beyond the ends of the sleeve, so as to overlap the ends of the pipes, thus leaving spaces between the cap and pipes, which are packed with oakum, &c., around the beads, as at $e$, and cement, lead, or other water and weather proof material at the ends, as at $f$.

Within the pipe, at the ends thereof, are fitted perforated diaphragms E, which abut against the outer sides of the beads $a$, and between the ends of the pipe is a perforated diaphragm, E', the diaphragms being formed of porcelain or other insulating material, and having the wires B passed through the perforations, whereby said wires are sustained and separated one from another.

The inner beads, $a$, may be in sections and the diaphragm E' cut away at its circumference, in order to pass said beads, but the diaphragm may be sprung into position.

The wires are coupled in the chamber $d$ by connecting-pieces B', which are flattened and somewhat bowed, and provided at their ends with hooks $g$, which enter eyes $g'$ formed with or connected to the ends of the wires, or vice versa. In the caps D are openings, which are occupied by screw-plugs F, and in the divided sleeve C are openings at relative places, whereby when the plugs are unscrewed or removed connections may be made with the wires B' for wires to be used in houses and stations, for lamp-posts, branch-offs, &c.

When a length of pipe is laid the wires, after leaving the starting-point, are run through the end diaphragm, E, and tightened. A stop, $k$, is then formed on each wire next to the diaphragm, on the outside thereof, by a drop of solder or piece of material soldered to it larger than the perforation through which wire is passed. The wire is then introduced through the central diaphragm, E', and finally through the other diaphragm E, at which latter place, on the outer side thereof, each wire, after being well stretched, has another stop, $k'$, formed on it by a drop of solder or piece of material soldered to it larger than the perforations in the diaphragm, it now being noticed that the wires as constructed hold the diaphragms E against the inner beads, $a$, and the wires are thereby well sustained and separated from each other. Another length of pipe is then laid and the wires thereof connected to those already laid by the coupling-pieces B'. The divided sleeve C and the coupling-cap D are then located and the packing and calking or filling applied, whereby the joints of the cap and pipes are sealed and water, &c., prevented from entering the chamber *d*. Should there be expansion of the pipes, they cannot approach each other nearer than what is permitted by the sleeve C, which, as has been stated, abuts against the beads *b*, or nearly so. When the wires expand the coupling-pieces B' bow to a greater extent, and when they contract said pieces straighten out, and thus the wires are not to be bent or displaced or injuriously stretched and broken. Should access to said chamber *d* be desired or required, the calking or packing may be removed, and the cap D is driven from its position, moving over either of the pipes which it coupled, whereby the sleeve C is uncovered and may be readily displaced, and the connecting-pieces B' and ends of the pipes, &c., are exposed.

For wires which change their directions at the intersection of streets or crossings I employ branched pipes or T's, as at A', and in the chamber or swell formed by said pipes I place upright rollers or rounded posts G, which are sustained on rings H at the top and bottom of the chamber by means of bolts H', which are passed through the posts and fitted in slots in the rings, nuts being screwed to the ends of the bolts to assist in retaining the posts in position.

It will be seen that when the course of the wires is to be changed at intersections, crossings, &c., they are passed around the rollers or posts G, and thus nicely bent without danger of being broken, and properly sustained in horizontal position.

At the back of the slots in which the bolts H' are fitted are springs or pieces *m*, of rubber or other elastic material, against which said bolts are rested. Should the wires B contract, the strain causes the posts to yield, whereby the wires are prevented from breaking, and when the wires expand the springs or pieces *m* force out the posts, thus causing the wires to be held taut and preventing downward shifting thereof.

Having thus described my invention, what I claim as new, and desire to secure by Letters Patent, is—

1. A conduit having a perforated diaphragm at each end thereof, in combination with wires for conducting electricity, said wires being passed through the perforations in said diaphragms, and each of them having a stop, *k*, formed by solder on each wire outside of each of said diaphragms.

2. A pair of conduits or pipe-sections, in combination with a divided metallic sleeve inclosing their proximate ends, a coupling-cap which incloses said sleeve and extends beyond the ends of the latter, and packing-rings interposed between said cap and said pipe at the ends of said sleeve, substantially as set forth.

3. The conduits or pipes formed with an exterior bead near each end, in combination with a divided metallic sleeve inclosing their proximate ends and interposed between the exterior beads, *b b*, and a coupling-cap which incloses said sleeve and proximate conduit ends, substantially as set forth.

4. The combination of the bowed coupling-pieces B' with the line-wires, said coupling-pieces being detachable from said wires and bending more readily than the latter.

5. The coupling-cap D, constructed with openings provided with plugs F, in combination with sleeve C, having an opening below said plugs, and the conduit-sections, coupling-pieces, and line-wires, substantially as set forth.

6. The combination, with a conduit containing line-wires, of a chamber formed at the intersection of the pipes, constructed as described, and having posts provided with elastic cushions and located in said chamber, the line-wires passing partly around said posts in changing their direction, substantially as set forth.

7. The combination, with a conduit containing line-wires, of a chamber formed at the intersection of the pipes, having the slotted ring H and posts G, provided with elastic cushions and located in said chamber, the line-wires passing partly around said posts in changing their direction, substantially as set forth.

8. The line-wires, in combination with the posts G, the slotted rings H, bolts H', and elastic pieces *m*, constructed and operating substantially as set forth.

THOMAS J. AGNEW.

Witnesses:
JOHN A. WIEDERSHEIM,
A. P. GRANT.